Dec. 6, 1949  H. R. BRISTOL  2,490,617
MOLTEN METAL PYROMETER DEVICE
Filed June 2, 1945
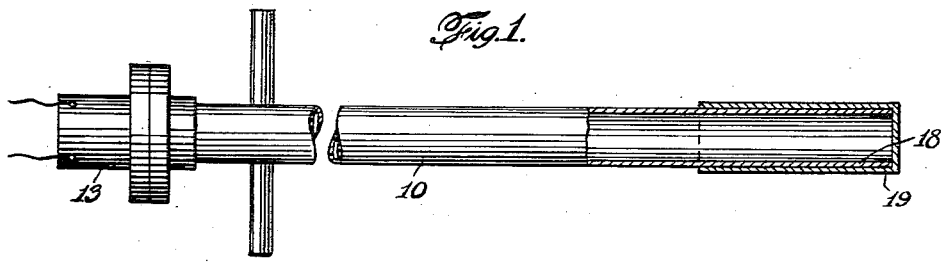
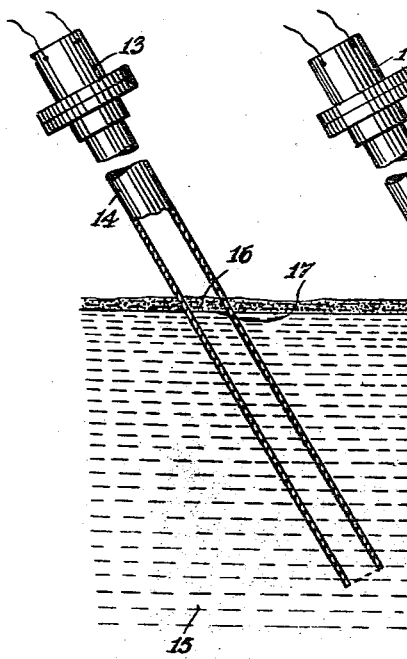
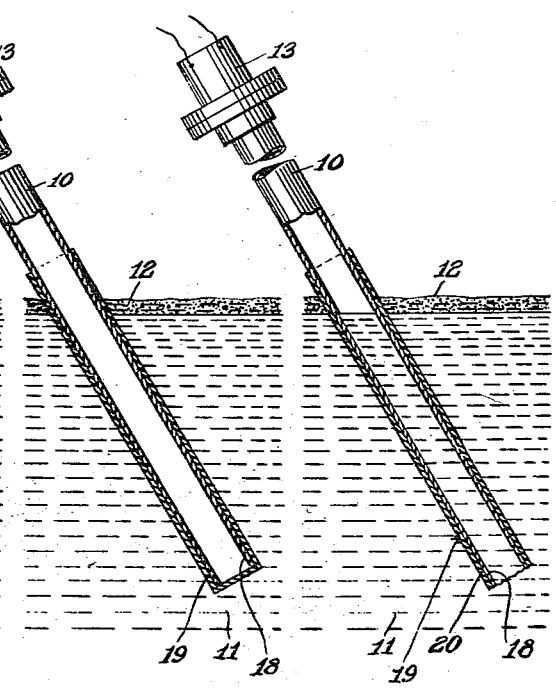
INVENTOR.
HAMILTON R. BRISTOL
BY
ATTORNEY.

Patented Dec. 6, 1949

2,490,617

UNITED STATES PATENT OFFICE 2,490,617

MOLTEN METAL PYROMETER DEVICE

Hamilton R. Bristol, Naugatuck, Conn., assignor to The Bristol Company, Waterbury, Conn., a corporation of Connecticut Application June 2, 1945, Serial No. 597,295

4 Claims. (Cl. 136—4)

The invention relates to the art of measuring very high temperatures, as in the case of devices for measuring molten steel, or other molten metal, temperatures such as prevail, for example, in typical open-hearth and similar furnaces for the production and/or refining of steel and other metals. It is particularly directed to pyrometer devices used for this purpose and more especially to the radiation type of pyrometer device.

In determining the temperature of molten metals, it is a common practice to "sight" a radiation pyrometer upon the surface of the bath of molten metal or furnace melt, so that radiant energy from said surface will enter the instrument and provide a corresponding temperature measurement. Since such a surface is usually covered with a supernatant layer of slag or other foreign matter, of relatively low thermal conductivity, and since the nature of its surface may be extremely variable, the radiated energy from that surface does not provide an accurate measure of the temperature of the molten metal beneath. It becomes important, therefore, that means be provided for minimizing the effect of said coating and for causing the pyrometer element to receive radiant energy directly from the metallic surface. It has been proposed to provide such a pyrometer with an open-ended tubular extension and to prevent entry of the material into said extension as by means of a stream of compressed air directed through the said open end of the tubular element. Aside from the additional expense involved and the cumbersome mechanism required to effect this air-flow cleaning, said stream has a natural tendency to oxidize the exposed surface of the molten metal and thus cause inaccuracies in the readings obtained by a pyrometer of the aforesaid nature.

It is an object of the present invention to provide means for sighting a radiation pyrometer directly on the metallic surface of a molten metal bath, without interference from foreign material floating thereon.

A further object of the invention is to provide means for temporarily closing off the immersible end of a sighting tube until such time as it will have cleared the slag or like layer in immersing the said tube end into a bath of molten metal; also, to protect said sighting tube end and thereby greatly prolong the effective life thereof.

A still further object of the invention is to provide a cap element to fit said immersible end of the sighting tube and to a sufficient distance to protect the immersed portion from slag and molten metal, said cap being replaceable after use.

Another object of the invention is to provide a radiation pyrometer device of rugged design and one which may be readily manufactured and withal render accurate determinations of the temperature of a molten metal or the like.

In carrying out the invention, a radiation pyrometer of conventional type is provided with a tubular sighting member closed at one end by a radiation-sensitive device of any well known or special design and responsive to radiations entering its opposite end when a fusible cap member provided thereover melts away upon immersion of the capped immersible end of the tubular member into the molten bath or into contact with its surface, after passing through any supernatant slag or other material.

The nature of the invention, however, will best be understood when described in connection with the accompanying drawings, in which:

Fig. 1 is an elevation of the novel pyrometer device, with portion shown in longitudinal section.

Fig. 2 is a sectional view of a portion of a molten metal bath having inserted therein a radiation pyrometer with a tubular extension, but without the application of any means to exclude the material of the bath from the interior of said extension.

Figs. 3 and 4 illustrate, similarly, the manner of utilizing the novel pyrometer device in determining the temperature of a molten metal.

Referring to the drawings, the novel pyrometer device is indicated as constructed of an elongated tubular member 10, preferably composed in part at least of highly refractory material or metal such as iron or steel, "Nichrome," or other material suited to the particular molten material in connection with which the pyrometer device is to be used. This tubular member is designed for immersion in a bath 11 of molten metal, or at least to be located in close proximity to the surface of said metal whose temperature it is desired to ascertain. Generally, there will be over the surface of said metal a blanket 12 of slag or other impurities at a temperature more or less different from that of the bath of molten metal, and in sighting the pyrometer on the bath it is desirable that a measure be performed upon radiations received from beneath such supernatant matter.

Such determination is made in conventional manner with any well known or specially designed pyrometer, indicated herein by its casing or the head 13 closing one of the ends of the tubular member. said pyrometer being sensitive to radiations falling thereon from the heated body or mass whose temperature it is desired to determine, as is well understood in the art and which forms no particular part of the present invention.

For example, photoelectric-type radiation pyrometers of the nature indicated in United States Letters Patent No. 2,184,169 may be utilized.

In order to eliminate extraneous influences, a radiation pyrometer may be fitted with a tubular extension 14, Fig. 2, affording a clear unobstructed passageway from end to end for the selected group of radiations to be measured; and such an extension, having its extremity immersed in a bath 15, would restrict the measured radiation to that received from the surface thereof. If this immersion be effected, as indicated in Fig. 2, it will, however, be obvious that the supernatant layer 16 of slag has not been removed over the molten metal surface 17, and that temperature determination will still be subject to errors resulting therefrom.

In accordance with the present invention, however, in a radiation pyrometer having a tubular extension with an immersible end portion 18, the latter is arranged to be temporarily closed to seal off the interior of the tubular member or sight tube 10 as well as to intercept undesired radiations when introducing its said end portion 18 into the molten metal 11 and through any supernatant material, as the blanket 12. This is effected by means of an extended tubular cap 19 composed of fusible sheet metal or other material suited to the temperature conditions of the metals with which the pyrometer device is to be utilized in ascertaining their respective temperatures and having a closed end of preferably flat conformation. For example, in the case of steel, the cap would be composed of a metal (steel) having a melting point not greatly exceeding that of the bath so that its flat end surface portion would readily be liquefied and mix with said bath.

Such cap is designed to be held to the immersible end of the tubular member, for example, by having a sliding fit therewith either thereover, as shown, or within the same; and it extends, preferably, a substantial distance toward the opposite end of said tubular member and may, if desired, have its open end emergent from the surface of the bath so as to afford protection against the high furnace temperatures. The said cap thus is adapted to seal off entirely the interior of member 10 to prevent entry of slag or foreign matter, and intercepts, until its closed end portion melts off under the heat of the molten metal when introduced into said metal, radiations from the metal. Only the desired radiations will thus pass through the sighting tube or tubular member 10 and an accurate reading of the temperature of the molten metal will be obtained, since a clean, unoxidized molten metal surface is presented for sighting.

It will be understood, of course, that a cap 19 must be replaced after each temperature determination, this being readily accomplished by sliding off the remaining unfused protective sleeve portion 20 of the cap fitting over the immersible end portion 18 of the tubular member and then installing a complete cap thereover.

In the provision of the fusable cap 19, fitted over the sighting tube immersible end portion 18, when such tube is inserted through the surface of the bath, as indicated in Fig. 3, the layer of slag is, of course, broken and forced aside. If the cap is of metal having a melting point not greatly higher than that of the bath, the material of its flat surface will shortly be liquefied and mix with the bath. Conditions will then be as indicated in Fig. 4, with the metal within the tube at substantially the same level as that outside, but without the layer of slag which normally characterizes the surface of the bath. The small quantity of air which may have been in the tube will not contain sufficient oxygen to contaminate the surface of the metal to any appreciable extent. The remaining sleeve 20 of unmelted cap provides a protective influence against action of the metal in the bath so long as such cap portion remains. When the tube is withdrawn from the bath, any remaining portion of the cap may readily be removed and a new cap placed in position for a succeeding observation.

I claim:

1. A radiation pyrometer device for measuring the temperature of molten metal, comprising a tubular sighting member, a radiation-sensitive device closing one end of the tubular sighting member, and a cap member formed of a material having a melting point not substantially greater than that of the molten metal being measured and fitted to the other end of the said tubular member to close off temporarily the interior thereof, said cap being insertable into the molten metal to be fused thereby for exposing the radiation-sensitive device directly to the radiations from an uncontaminated surface of the molten metal.

2. A radiation pyrometer device as set forth in claim 1, wherein the tubular member in part at least is of refractory material and the cap extends thereover a substantial distance toward the radiation-sensitive device.

3. A radiation pyrometer device as set forth in claim 1, wherein the cap has a sliding fit over the end of the tubular member to be replaceable by a new cap after each temperature determination.

4. A radiation pyrometer device as set forth in claim 1, wherein the cap is composed of the same metal as that the temperature of which in molten state is to be determined.

HAMILTON R. BRISTOL.

REFERENCES CITED

The following references are of record in the file of this patent:

UNITED STATES PATENTS

| Number | Name | Date |
|---|---|---|
| 1,318,516 | Wallis et al. | Oct. 14, 1919 |
| 2,020,019 | Collins et al. | Nov. 5, 1935 |
| 2,127,889 | Shenk et al. | Aug. 23, 1938 |
| 2,151,928 | Mead | Mar. 28, 1939 |
| 2,184,169 | Sordahl | Dec. 19, 1939 |

OTHER REFERENCES

Schofield, F. H., J. Iron and Steel Institute, vol. 135 (1937), pgs. 270A, 271A.

Schofield et al., Temperature, Am. Inst. Physics (1941), pgs. 937, 938, 941.

Sordahl et al., ibid., pg. 928.

Sordahl et al., Temperature, Am. Inst. Physics (1941), pg. 933.